United States Patent [19]

Friedman

[11] 4,114,985
[45] Sep. 19, 1978

[54] SHIELD FOR HIGH POWER INFRARED LASER BEAM

[76] Inventor: Jerome D. Friedman, 15 Lake St., Lexington, Mass. 02173

[21] Appl. No.: 457,674

[22] Filed: Mar. 28, 1974

[51] Int. Cl.² .................. G05D 25/00; G21F 5/04
[52] U.S. Cl. .................. 350/266; 219/121 L; 250/514; 250/515
[58] Field of Search .................. 350/266, 160 R, 1; 250/510, 514, 515; 356/71; 331/94.5 T, 94.5 A; 219/121 LM, 121 L

[56] References Cited

U.S. PATENT DOCUMENTS 3,615,317  10/1971  Jagodzinski et al. ............ 350/160 R
3,620,597  11/1971  Schwartz et al. ................ 350/160 R

*Primary Examiner*—S. C. Buczinski
*Attorney, Agent, or Firm*—Joseph E. Rusz; Willard R. Matthews, Jr.

[57] ABSTRACT

Shielding from and the termination of high power infrared laser beams is accomplished by interception of the beam by one of two spaced, juxtaposed, ceramic sheet members. The beam intercepting member has a thickness to beam power density relationship that allows opaque to translucent conversion of the portion thereof illuminated by the beam. The translucent portion subsequently diffuses the beam. The diffused beam is then absorbed by the second ceramic sheet member.

3 Claims, 1 Drawing Figure

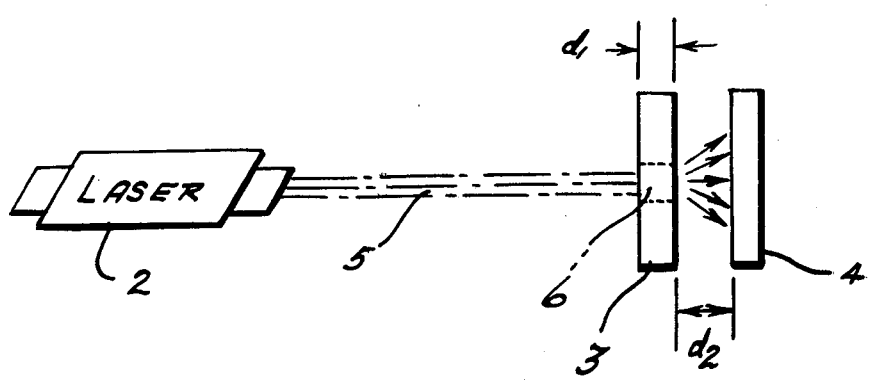

SHIELD FOR HIGH POWER INFRARED LASER BEAM

BACKGROUND OF THE INVENTION

This invention relates to high power infrared lasers, and in particular to means for terminating and providing shielding from the high power beam generated thereby.

It is often necessary to protect various devices such as fusion reactors, satellites, aircraft and the like, from laser beams. It is also necessary in certain laser systems to terminate the laser beam without damage to surrounding equipment or personnel. Currently available means for accomplishing this are often unsatisfactory for various reasons and are usually limited to specific applications. For instance, the use of ablative material for shielding provides means having only a limited life since the material is destroyed in the shielding or beam terminating process. The use of reflecting surfaces, such as mirrors, only serves to deflect the beam, leaving the beam termination problem to be solved at another location. Furthermore, reflective surfaces that are effective at one wavelength may not be effective at another different wavelength, thus limiting the shielding effectiveness to certain lasers. The use of beam diffusing lenses requires advance knowledge of the point of impingement of the laser beam. Although such a means is effective in fixed laser system beam termination, the lens location problem renders it inapplicable for shielding and for use in other laser system applications. There currently exists, therefore, the need for a device that will provide shielding from and the termination of high power laser beams in any of the above enumerated and other applications. The present invention is directed toward achieving this end.

SUMMARY OF THE INVENTION

The invention comprehends shielding from and termination of high power laser beams by means of a clay base ceramic sheet. Under appropriate conditions the laser beam converts the portion of the ceramic sheet upon which it impinges into a jewel-like lens. This portion subsequently permits the passage of the beam in a diffused state. A second ceramic sheet (or other heat collecting and dissipating device) is placed behind the beam intercepting ceramic sheet at a distance that allows Raleigh type scattering of the diffused beam and collection and dissipation of heat energy generated thereby.

It is a principal object of the invention to provide a new and improved shield for high power laser beams.

It is another object of the invention to provide a shield for a high power laser beam that has universal application.

It is another object of the invention to provide a shield for a high power laser beam that is not destroyed by the beam.

These, together with other objects, features and advantages of the invention, will become more readily apparent from the following detailed description when taken in conjunction with the illustrative embodiment in the accompanying drawing.

DESCRIPTION OF THE DRAWING

The sole FIGURE of the drawing illustrates one presently preferred embodiment of the invention.

DETAILED DESCRIPTION OF THE PREFERRED EMBODIMENT

Referring now to the sole FIGURE of the drawing, high power laser beam 5 from laser source 2 is intercepted by ceramic sheet member 3. A second sheet member 4 is positioned a distance $d_2$ from and in parallel relationship with sheet member 3. Sheet member 3 is fabricated of a clay base ceramic material such as kaolinite ($Al_2O_3 \cdot 2SiO_2$). Its thickness $d_1$ is determined in part by the diameter and power of laser beam 5. In principle the invention functions on the relationship between the laser beam power density and the type of material and thickness of the shield (sheet member 3). It has been discovered that for an appropriate shield thickness the impinging laser beam will convert the portion of shield impinged upon (portion 6 of sheet member 3) from opaque clay ceramic to translucent jewel-like material. The laser beam then passes through the translucent portion (which behaves as a Raleigh type lens) and is scattered as diffused light as it emerges from the other side. Sheet member 4, which can be clay ceramic or any suitable heat sink type material, then absorbs and dissipates the heat energy from the diffused diffracted laser beam. The dimension $d_2$ is made any suitable length that permits Raleigh scattering and efficient heat transfer. The thickness of sheet member 3 is controlled by the type of clay ceramic used (its thermal coefficient) and the diameter and power of the laser beam. That is, a given laser beam would burn a hole through a too-thin member and fail to convert a too-thick member to translucent material. Although the various relationships involved can be stated analytically in terms of mathematical equations, such an approach would be unduly cumbersome in view of the great number of clay ceramics and laser beam parameters to be considered. The invention is more conveniently practiced by empirically determining the appropriate shield thickness for each individual application. By way of example, an operable device was fabricated for termination of a 300 watt $CO_2$ laser generating a 4 mm diameter, $10.6\mu$ laser beam using a clay base shield having a thickness of 4 mm.

Although the present invention has been described with reference to a specific embodiment, it is not intended that the same should be taken in a limiting sense. Accordingly, it is understood that the scope of the invention in its broader aspects is to be defined by the appended claims only and no limitation is to be inferred from definitive language used in describing the preferred embodiment.

I claim:

1. A shield for terminating the beam of a high power infrared laser source comprising
first and second spaced, juxtaposed, opaque, clay base, ceramic sheet members, said first sheet member intercepting said beam and having a sheet thickness to beam power density relationship that allows opaque to translucent conversion of said first sheet member by said beam and said second sheet member being spaced from said first sheet member a distance that permits Raleigh scattering and effective heat transfer of laser energy transmitted through said first sheet member.

2. A shield for terminating the beam of a high power infrared laser source as defined in claim 1 wherein said laser source generates a 4 mm diameter 300 watt beam at a wavelength of $10.6\mu$ and said first sheet member has a thickness of 4 mm.

3. A shield for terminating the beam of a high power infrared laser source as defined in claim 2 wherein said first sheet member consists of kaolinite.

* * * * *